United States Patent
Hong

(10) Patent No.: US 7,774,515 B2
(45) Date of Patent: Aug. 10, 2010

(54) DEVICE FOR PREVENTING PROCESS COLLISION BASED ON PLURAL INPUTTED SIGNALS

(75) Inventor: Byung-Il Hong, Chungcheongbuk-do (KR)

(73) Assignee: Magnachip Semiconductor, Ltd. (KR)

( * ) Notice: Subject to any disclaimer, the term of this patent is extended or adjusted under 35 U.S.C. 154(b) by 1412 days.

(21) Appl. No.: 11/193,218

(22) Filed: Jul. 28, 2005

(65) Prior Publication Data
US 2006/0034169 A1    Feb. 16, 2006

(30) Foreign Application Priority Data
Jul. 29, 2004    (KR) .................. 10-2004-0059671

(51) Int. Cl.
*G06F 3/00* (2006.01)
(52) U.S. Cl. .................. 710/36; 710/15; 710/20; 710/40
(58) Field of Classification Search .............. None
See application file for complete search history.

(56) References Cited

U.S. PATENT DOCUMENTS

| 4,860,006 | A | * | 8/1989 | Barall | 370/447 |
| 5,179,577 | A | * | 1/1993 | Ilyadis | 375/317 |
| 5,452,422 | A | * | 9/1995 | Okamoto et al. | 710/113 |

* cited by examiner

*Primary Examiner*—Alan Chen
(74) *Attorney, Agent, or Firm*—Blakely, Sokoloff, Taylor & Zafman

(57) ABSTRACT

A device for preventing a process collision based on plural of input signals includes an input block for receiving a first and a second input signals to thereby generates a first and a second process request signals, a collision controller for controlling the process collision in accordance with a predetermined priority, and a signal processing block for outputting a first process signal in response to the first process request signal and outputting a second process signal in response to the second process request signals. Herein, the process collision is caused one of cases when the second input signal is inputted at an activation sector of the first process signal of the first input signal, when the first input signal is inputted at an activation sector of the second process signal of the second input signal, and when the first and the second inputs are inputted concurrently.

21 Claims, 10 Drawing Sheets

DEVICE FOR PREVENTING PROCESS COLLISION BASED ON PLURAL INPUTTED SIGNALS

FIELD OF INVENTION

The present invention relates to a semiconductor device; and, more particularly, to a device for preventing a process collision based on a plurality of inputted signals.

DESCRIPTION OF PRIOR ART

Generally, a system receives a plurality of input signals and processes the input signals to thereby output a result in accordance with a purpose of the system.

The system has plural resources such as an input buffer, a signal processing unit, and etc. The resource in the system can receive a plurality of different input signals. Herein, a reliability of the system can be degraded if it is not accurately controlled that the input signals are inputted or accessed to the resource.

A first-come first-service (hereinafter, referred as FCFS) method is one of the most widely used method for controlling the access of the input signals to the resource in the system. In the FCFS method, the first input signal inputted or accessed to a predetermined resource acquires a top priority for accessing the resource and, therefore, is processed firstly.

However, a conventional semiconductor memory device is able to perform the FCFS method only for the input signals inputted one by one. In other words, when at least two input signals are inputted concurrently or simultaneously, there is no method for the conventional semiconductor memory device to control the input signals. Therefore, a reliability of the conventional semiconductor memory device is degraded.

SUMMARY OF INVENTION

It is, therefore, an object of the present invention to provide a device for preventing a process collision based on a plurality of input signals which improves a reliability of a system.

In accordance with an aspect of the present invention, there is provided a device for preventing a process collision based on a plurality of input signals includes an input block for receiving a first and a second input signals to thereby generates a first and a second process request signals, a collision controller for controlling a process collision in accordance with a predetermined priority, and a signal processing block for outputting a first process signal in response to the first process request signal and outputting a second process signal in response to the second process request signals. Herein, the process collision is caused one of a case when the second input signal is inputted at an activation sector of the first process signal of the first input signal, a case when the first input signal is inputted at an activation sector of the second process signal of the second input signal, and a case when the first and the second inputs are inputted concurrently.

In accordance with another aspect of the present invention, there is provided a device for preventing the process collision based on the plural input signals includes an input block for receiving a plurality of input signals to thereby generates process request signals for corresponding input signals when activation sectors of the input signals are not overlapped, a signal processing block for outputting a process signal of the corresponding input signal in response to the process request signal, and a collision controller for controlling the signal processing block by inactivating the process requesting signals except the process requesting signal of a first input signal which has a top priority, when more than two input signals of the input signals are inputted concurrently, and activating the process signals of input signals except the first input signal in accordance with a predetermined priority after a process of the first input signal is completed.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a device, e.g., first-come first-served (hereinafter, referred as FCFS) device, for preventing a process collision based on a plurality of input signals in accordance with the present invention will be described in detail referring to the accompanying drawings.

Figure 1:
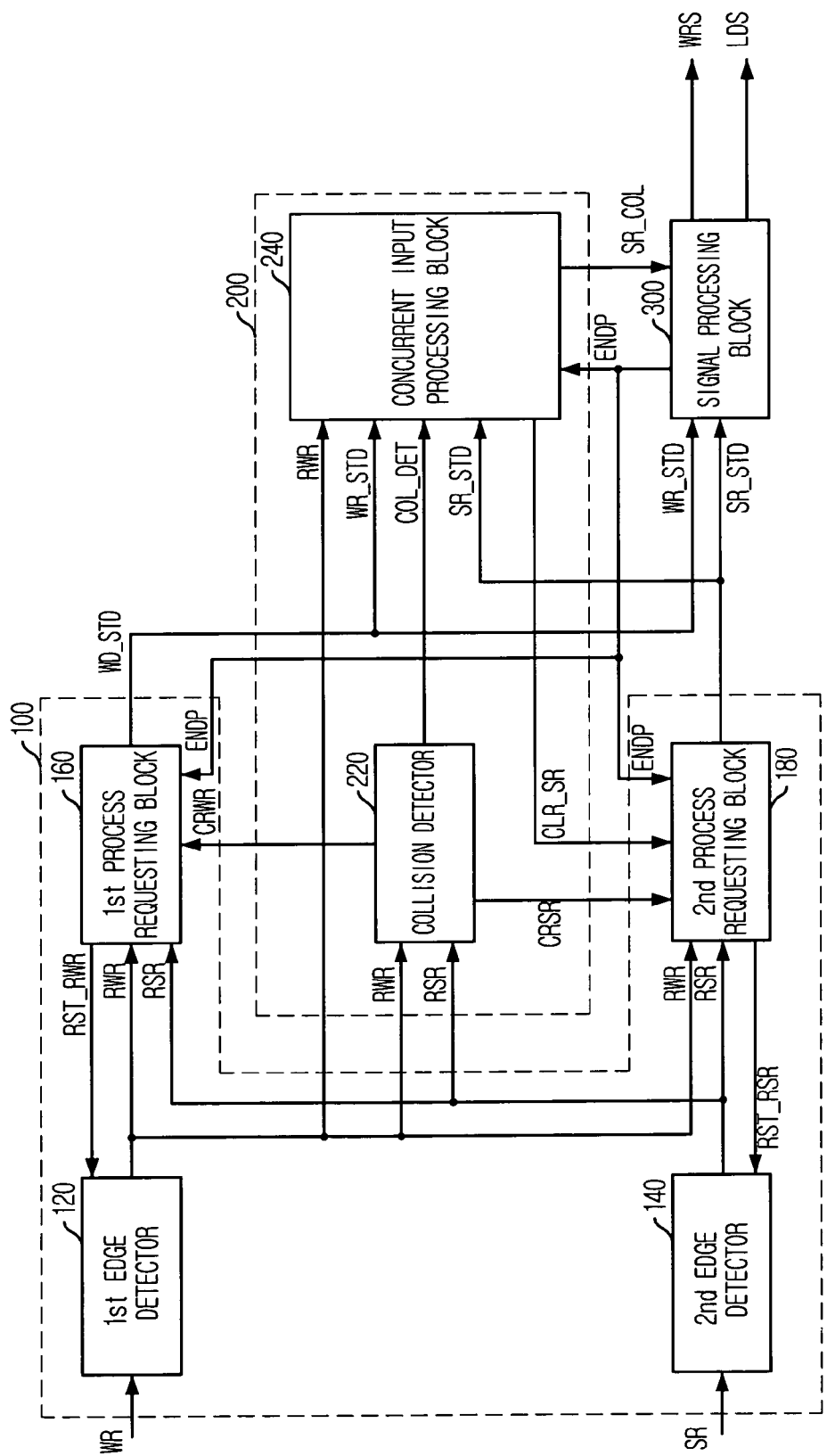
FIG. 1 is a block diagram showing a first-come first-served device in accordance with a preferred embodiment of the present invention.

FIG. 1 is a block diagram showing the FCFS device in accordance with a preferred embodiment of the present invention.

As shown, the FCFS device is provided with an input block 100, a signal processing block 300, and a collision controller 200.

The input block 100 receives a first and a second input signals WR and SR to thereby generate a first and a second process request signals WR_STD and SR_STD. The first and the second process request signals WR_STD and SR_STD are generated only when activation sectors of the first and the second input signals WR and SR are not overlapped. The signal processing block 300 outputs one of a first process signal WRS and a second process signal LDS in response to the process request signals WR_STD and SR_STD. When the first and the second input signals are inputted concurrently, the collision controller 200 inactivates the second process request signal SR_STD of the second input signal SR which has a less priority in accordance with a predetermined priority. Then, the collision detector 200 controls the signal processing block 300 to activate the second process signal LDS after an activation sector of the first process request signal WR_STD of the first input signal WR is terminated. Herein, in the present invention, the first input signal WR has the priority over the second input signal SR when the two input signals WR and SR are inputted concurrently.

In detail, the input block 100 includes a first and a second edge detectors 120 and 140 and a first and a second process requesting blocks 160 and 180. The first edge detector 120 detects the first input signal WR to thereby output a first edge detecting signal RWR. The second edge detector 140 detects the second input signal SR to thereby output a second edge detecting signal RSR. The first process requesting block 160 outputs the first process request signal WR_STD in response to the first edge detecting signal RWR while the second edge detecting signal RSR is inactivated. The second process requesting block 180 outputs the second process request signal SR_STD in response to the second edge detecting signal RSR while the first edge detecting signal RWR is inactivated.

The collision controller 200 includes a collision detector 220 and a concurrent input processing block 240. The collision detector 220 detects whether activation sectors of the first and the second edge detecting signals RWR and RSR are overlapped or not. The concurrent input processing block 240 detects the first and the second edge detecting signals RWR and RSR under a control of the collision detector 220. If the first and the second input signals WR and SR are inputted simultaneously or concurrently, the concurrent input processing block 240 inactivates the second edge detecting signal RSR in accordance with the priority. Then, the concurrent input processing block controls the signal processing block 300 to activate the second process signal LDS of the second input signal SR after the activation sector of the first process request signal WR_STD is terminated.

The signal processing block 300 outputs a first process signal WRS in response to the first process request signal WR_STD and outputs a second process signal LDS in response to the second process request signal SR_STD controlled by the collision controller 200.

In addition, the fist and the second edge detectors 120 and 140 are implemented with a first and a second flip-flops, respectively. The first flip-flop, which is reset by a first reset signal RST_RWR outputted from the first process requesting block 160, outputs the first edge detecting signal RWR in response to the first input signal. The second flip-flop, which is reset by a second reset signal RST_RSR outputted from the second process requesting block 180, outputs the second edge detecting signal RSR in response to the second input signal SR.

Figure 2:
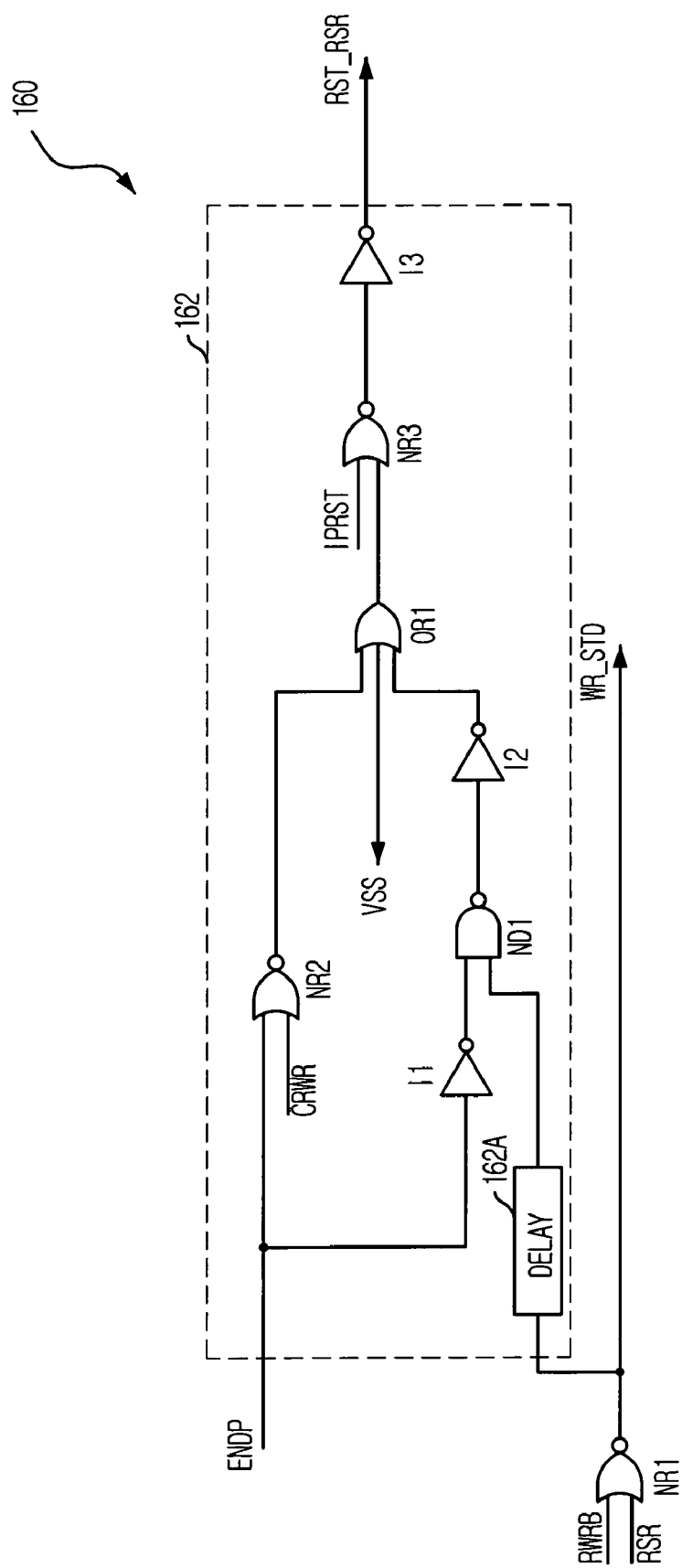
FIG. 2 is a schematic circuit diagram describing a first process requesting block shown in FIG. 1.

FIG. 2 is a schematic circuit diagram describing the first process requesting block 160 shown in FIG. 1.

As shown, the first process requesting block 160 is provided with a first NOR gate NR1 and a first reset signal generator 162. The first NOR gate NR1 receives a first inversed edge detecting signal RWRB and the second edge detecting signal RSR to thereby output the first process request signal WR_STD. The first reset signal generator 162 generates the first reset signal RST_RWR for resetting the first edge detector 120 when a first end-up signal ENDP and a first request control signal CRWR are activated or when the first end-up signal ENDP and the first process request signal WR_STD are activated.

The first reset signal generator 162 is provided with a first delay 162A, a first to a third inverters I1, I2, and I3, a first NAND gate ND1, a second and a third NOR gates NR2 and NR3, and a first OR gate OR1. The first delay 162A delays the first process request signal WR_STD for a predetermined time. The first inverter I1 inverts the first end-up signal ENDP. The first NAND gate ND1 receives an output from the first inverter I1 and an output from the first delay 162A. The second inverter I2 inverts an output from the first NAND gate ND1. The second NOR gate NR2 receives the first end-up signal and the first request control signal CRWR. The first OR gate OR1 receives an output from the second NOR gate NR2 and an output from the second inverter I2. The first OR gate OR1 further receives a ground voltage VSS as a third input. The third NOR gate NR3 receives an output from the first OR gate OR1 and an initializing signal IPRST. The third inverter I3 inverts an output from the third NOR gate NR3 to thereby output the first reset signal RST_RWR for resetting the first edge detector 120.

The first process requesting block 160 generates the first process request signal WR_STD only when the second edge detecting signal RSR is inactivated and the first edge detecting signal RWR is activated. In this way, a process collision, caused when the second input signal SR is inputted at an activation sector of the first process signal WRS, when the first input signal WR is inputted at an activation sector of the second process signal LDS, or when the first and the second inputs WR and SR are inputted concurrently, is prevented.

Further, when the activation sector of the first process signal WRS is terminated, the first process requesting block 160 resets the first edge detector 120 by using the first reset signal RST_RWR to thereby wait for the following first input signal WR.

Figure 3:
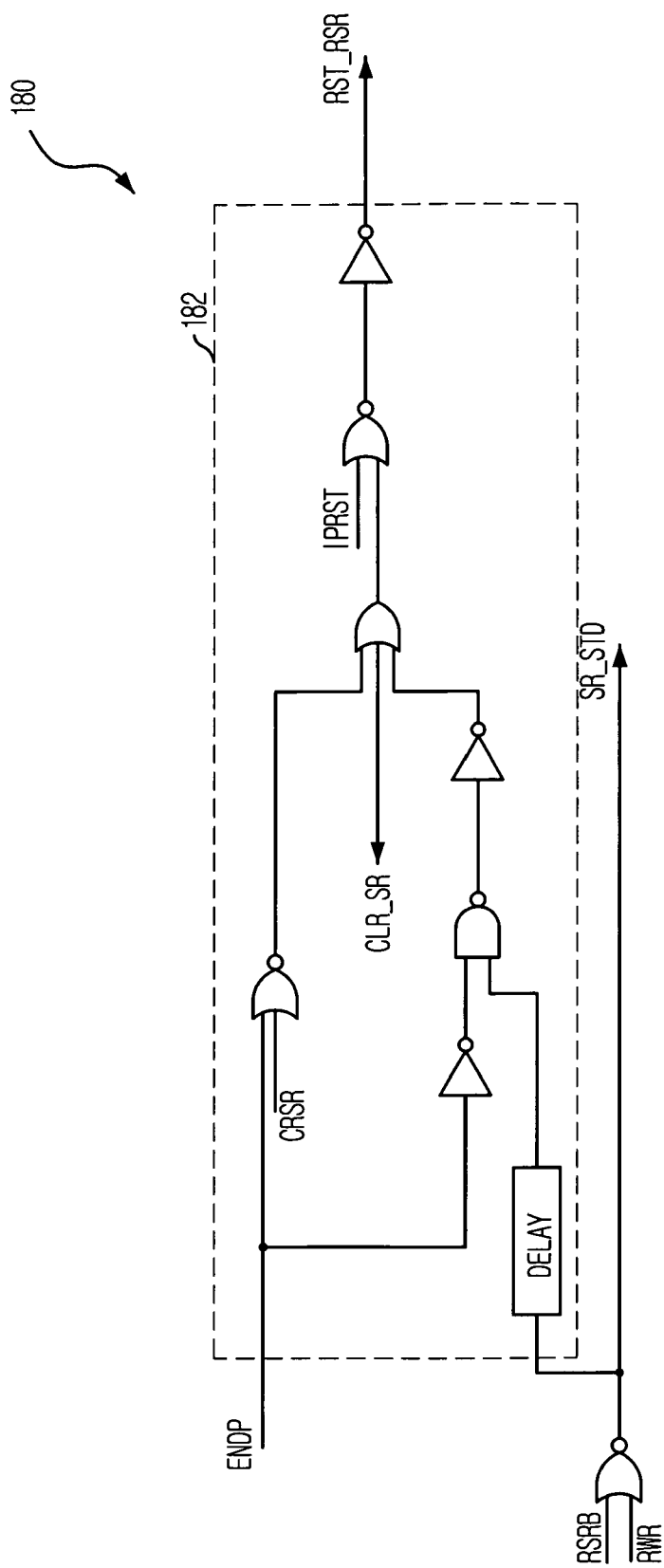
FIG. 3 is a schematic circuit diagram depicting a second process requesting block shown in FIG. 1.

FIG. 3 is a schematic circuit diagram depicting the second process requesting block 180 shown in FIG. 1.

Comparing with the first process requesting block 160 shown in FIG. 2, the second process requesting block 180 has the same structure with the first process requesting block 160 except a fact that a second request control signal CRSR and a clear input signal CLR_SR are inputted to a second reset signal generator 182 instead of the first request control signal CRWR and the ground voltage VSS, respectively, to thereby output the second reset signal RST_RSR instead of the first reset signal RST_RWR. Herein, the clear input signal CLR_SR resets the second edge detector 140 to thereby inactivate the second process request signal SR_STD. That is, when the input signals WR and SR are inputted concurrently, the second reset signal generator 182 outputs the second reset signal RST_RSR to thereby reset the second edge detector 140. Thus, in this way, the second process request signal SR_STD is not activated.

Figure 4:
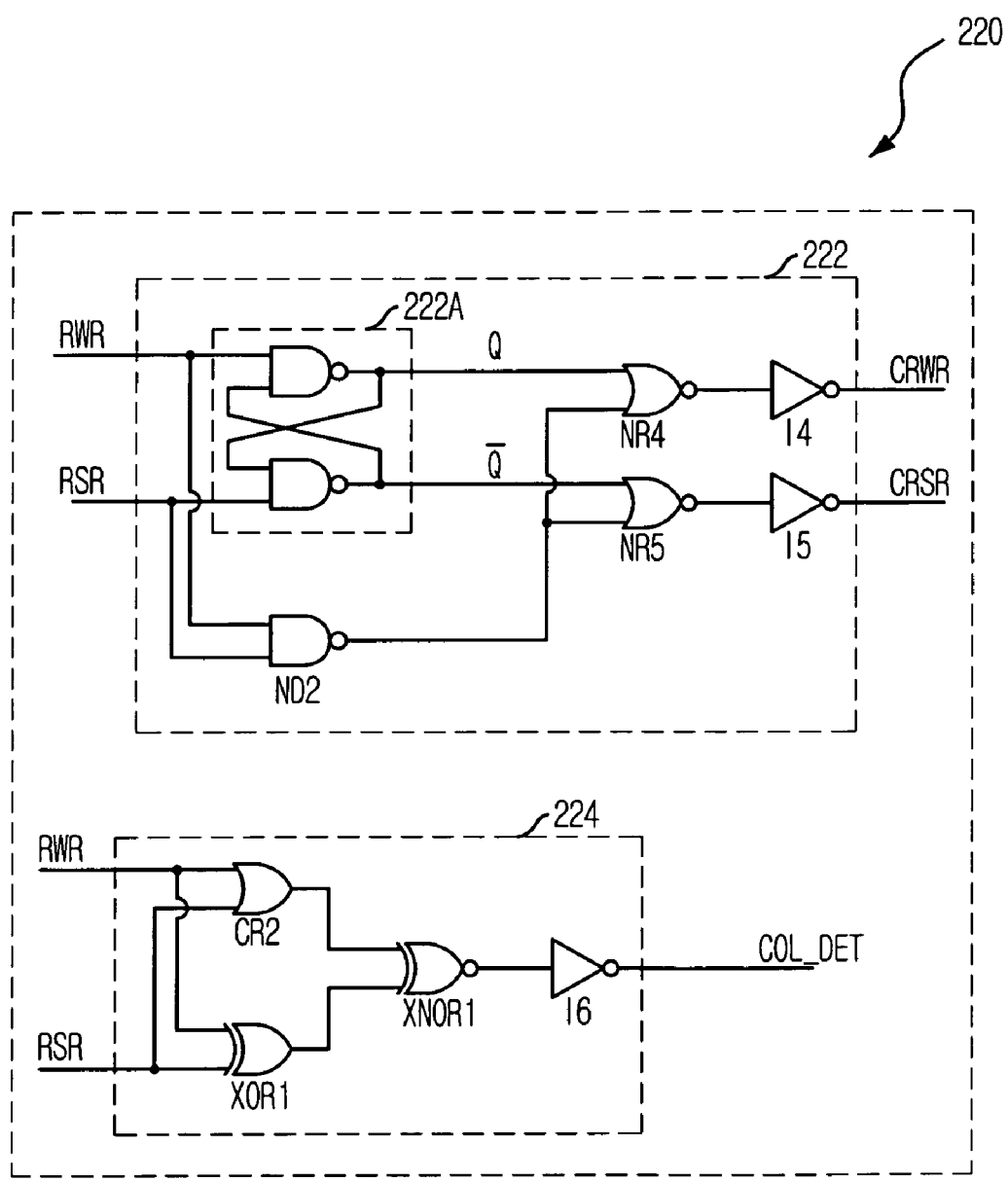
FIG. 4 is a schematic circuit diagram describing a collision detector shown in FIG. 1.

FIG. 4 is a schematic circuit diagram describing the collision detector 220 shown in FIG. 1.

As shown, the collision detector 220 includes a request control signal generator 222 and a collision detection signal generator 224. The request control signal generator 222 outputs the first request control signal CRWR for resetting the first edge detector 120 when the second edge detecting signal RSR is activated at the activation sector of the first edge detecting signal RWR. Otherwise, the request control signal generator 222 outputs the second request control signal CRSR for resetting the second edge detector 140 when the first edge detecting signal RWR is activated at the activation sector of the second edge detecting signal RSR. The collision detection signal generator 224 generates a collision detection signal COL_DET when the activation sectors of the first and the second edge detecting signals RWR and RSR are overlapped.

The request control signal generator 222 is provided with a first RS latch 222A, a second NAND gate ND2, a fourth and a fifth NOR gates NR4 and NR5, and a fourth and a fifth inverters I4 and I5. The first RS latch 222A receives the first edge detecting signal RWR as an enable signal and receives the second edge detecting signal RSR as a reset signal. The second NAND gate ND2 receives the first and the second edge detecting signals RWR and RSR. The fourth NOR gate NR4 receives a first output Q of the first RS latch 222A and an output from the second NAND gate ND2. The fourth inverter I4 inverts the output from the fourth NOR gate NR4 to thereby output the first request control signal CRWR. The fifth NOR gate NR5 receives a second output $\overline{Q}$ of the first RS latch 222A and the output from the second NAND gate ND2. The fifth inverter I5 inverts an output from the fifth NOR gate NR5 to thereby output the second request control signal CRSR.

The collision detection signal generator 224 includes a second OR gate OR2, a first exclusive-OR gate XOR1, a first exclusive-NOR gate XNOR1, and a sixth inverter I6. The second OR gate OR2 receives the first and the second edge detecting signals RWR and RSR. The first exclusive-OR gate XOR1 receives the first and the second edge detecting signals RWR and RSR. The first exclusive-NOR gate XNOR1 receives an output from the second OR gate OR2 and an output from the first exclusive-OR gate XOR1. The sixth inverter I6 inverts an output from the first exclusive-NOR gate XNOR1 to thereby output the collision detection signal COL_DET.

Figure 5:
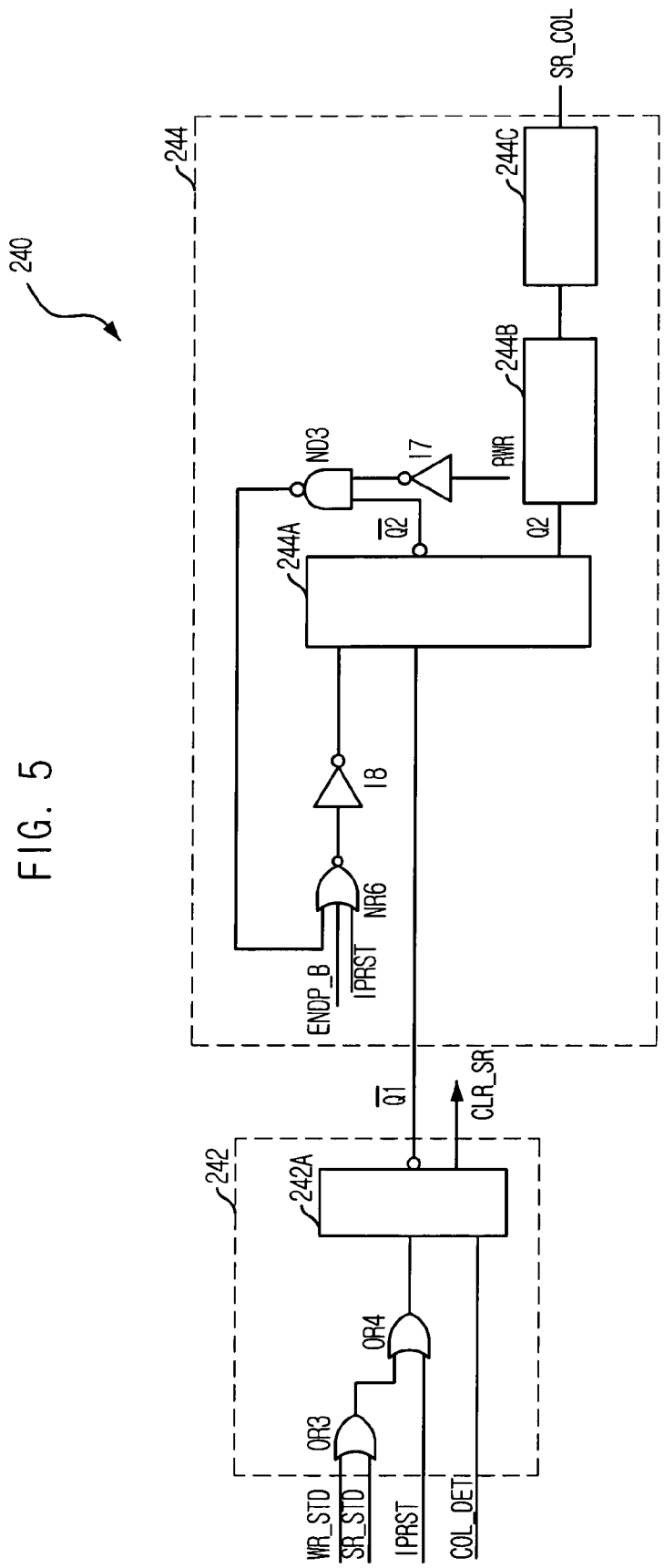
FIG. 5 is a schematic circuit diagram showing a concurrent input processing block shown in FIG. 1.

FIG. 5 is a schematic circuit diagram showing the concurrent input processing block 240 shown in FIG. 1.

As shown, the concurrent input processing block 240 includes a clear signal generator 242 and a collision process signal generator 244. The clear signal generator 242 generates the clear input signal CLR_SR for inactivating the second edge detecting signal RSR when the collision detection signal COL_DET and the first process request signal WR_STD are activated or when the collision detection signal COL_DET and the second process request signal SR_STD are activated. The collision process signal generator 244 generates a collision process signal SR_COL for activating the second process signal LDS after a predetermined time.

The clear signal generator 242 is provided with a third and a fourth OR gates OR3 and OR4 and a third flip-flop 242A. The third OR gate OR3 receives the first and the second process request signals WR_STD and SR_STD. The fourth OR gate OR4 receives an output from the third OR gate OR3 and the initializing signal IPRST. The third flip-flop 242A receives an output from the fourth OR gate OR4 and the collision detection signal COL_DET. When the output from the fourth OR gate OR4 and the collision detection signal COL_DET are activated, the third flip-flop 242A outputs a first output as the clear signal CLR_SR.

The collision process signal generator 244 is provided with a fourth flip-flop 244A, first and second pulse generators 244B and 244C, seventh and eighth inverters I7 and I8, a third NAND gate ND3, and a sixth NOR gate NR6. The fourth flip-flop 244A receives a second output $\overline{Q1}$ of the third flip-flop 242A and an output from the eighth inverter I8. The first pulse generator 244B generates a first pulse signal in response to a first output Q2 of the fourth flip-flop 244A. The second pulse generator 244C generates a second pulse signal in response to the first pulse signal outputted from the first pulse generator 244B. Herein, the second pulse signal is the collision process signal SR_COL.

Further, the seventh inverter I7 inverts the first edge detecting signal RWR. The third NAND gate ND3 receives an output from the seventh inverter I7 and a second output $\overline{Q2}$ of the fourth flip-flop 244A. The sixth NOR gate NR6 receives an output from the third NAND gate ND3, a second end-up signal ENDP_B, and the initializing signal IPRST. The eight inverter I8 resets the fourth flip-flop 244A by inverting an output from the sixth NOR gate NR6.

Putting abovementioned together, the concurrent input processing block 240 detects the process collision by using the collision detection signal COL_DET and the first and the second process request signals WR_STD and SR_STD. After the process collision is detected, the second process request signal SR_STD is inactivated by inactivating second edge detecting signal RSR in accordance with the predetermined priority. In order to activates the second process signal LDS after the activation sector of the first process signal WRS is terminated, the concurrent input processing block 240 generates the collision process signal SR_COL.

Figure 6:
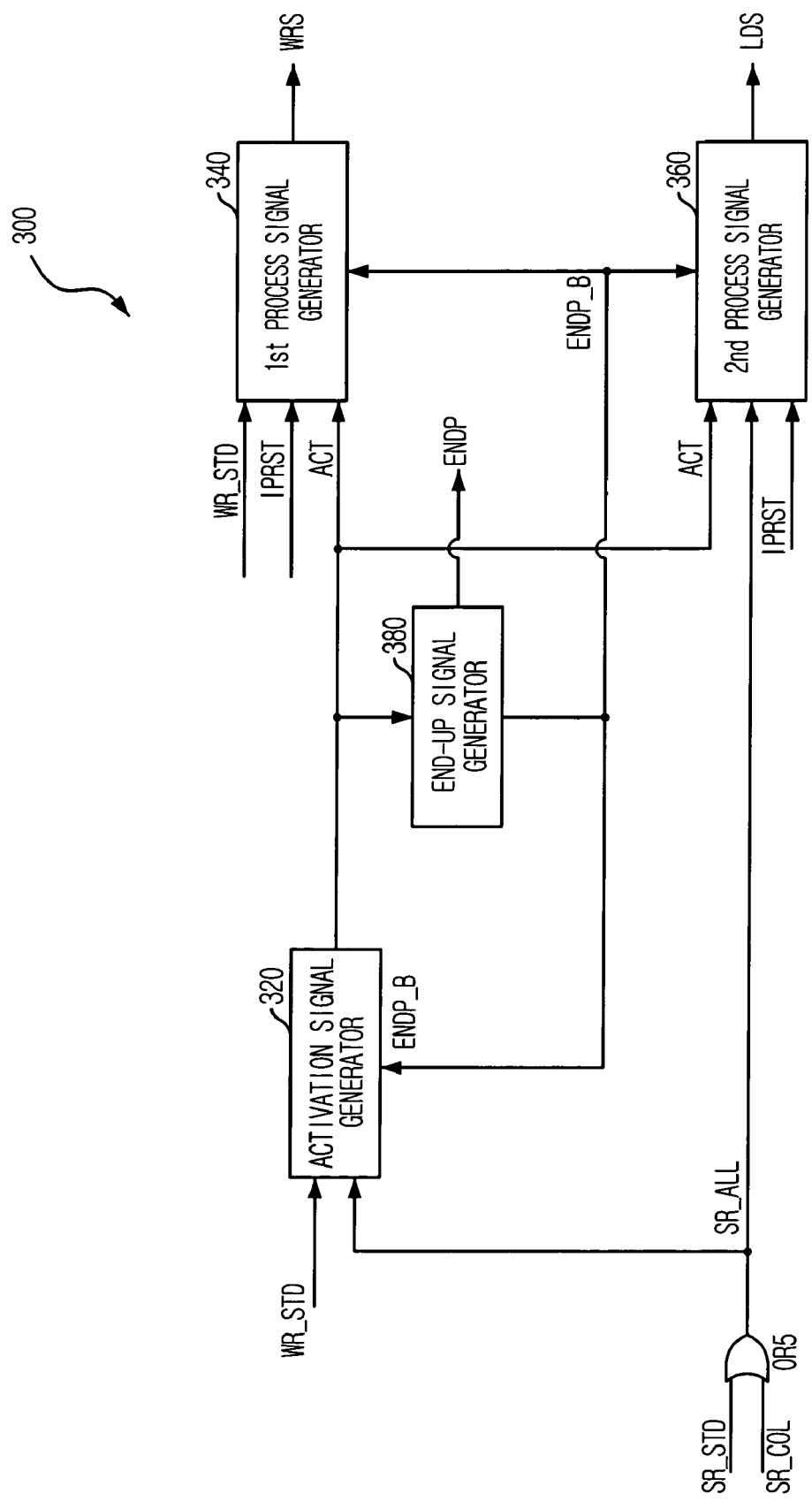
FIG. 6 is a block diagram showing a signal processing block shown in FIG. 1.

FIG. 6 is a block diagram showing the signal processing block 300 shown in FIG. 1.

As shown, the signal processing block 300 includes a fifth OR gate OR5, an activation signal generator 320, first and second process signal generators 340 and 360, and an end-up signal generator 380.

The fifth OR gate OR5 receives the second process request signal SR_STD and the collision process signal SR_COL to thereby output a total process request signal SR_ALL. The activation signal generator 320 receives the total process request signal SR_ALL and the first process request signal WR_STD to thereby output an activation signal ACT. The first process signal generator 340 receives the activation signal ACT, the first process request signal WR_STD, and the initializing signal IPRST. When the first process request signal WR_STD is activated, the first process signal generator 340 outputs the first process signal WRS in response to the activation signal ACT. The second process signal generator 360 receives the activation signal ACT, the total process request signal SR_ALL, and the initializing signal IPRST. When the total process request signal SR_ALL is activated, the second process signal generator 360 outputs the second process signal LDS in response to the activation signal ACT. The end-up signal generator 380 generates the first and the second end-up signals ENDP and ENDP_B in response to the activation signal ACT. The first and the second end-up signals ENDP and ENDP_B are generated after a predetermined time passes from an activation of the activation signal ACT.

In addition, the activation signal generator 320, and the first and the second process signal generators 340 and 360 are initialized in response to an activation of the second end-up signal ENDP_B.

Figure 7A:
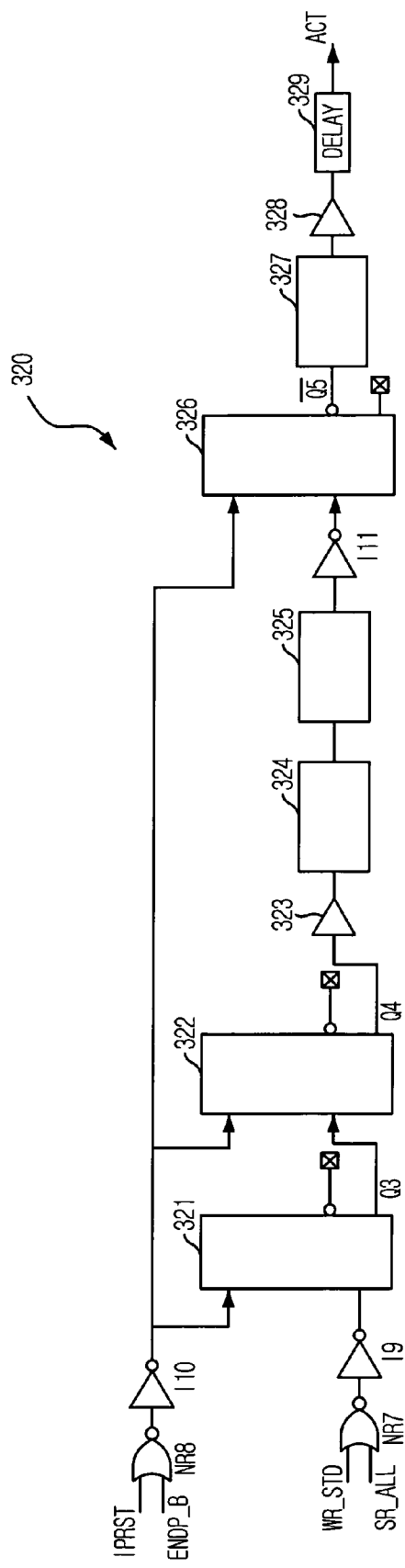
FIG. 7A is a schematic circuit diagram depicting an activation signal generator shown in FIG. 6.

FIG. 7A is a schematic circuit diagram depicting the activation signal generator 320 shown in FIG. 6.

As shown, the activation signal generator 320 is provided with a seventh and an eighth NOR gates NR7 and NR8, a ninth to an eleventh inverters I9 to I11, a fifth to a seventh flip-flops 321, 322, and 326, a first and a second buffers 323 and 328, a third to a fifth pulse generators 324, 325, and 327, and a delay 329.

The seventh NOR gate NR7 receives the total process request signal SR_ALL and the first process request signal WR_STD. The ninth inverter I9 inverts an output from the seventh NOR gate NR7. The eighth NOR gate NR8 receives the second end-up signal ENDP_B and the initializing signal IPRST. The tenth inverter I10 inverts an output from the eighth NOR gate NR8. The fifth flip-flop 321 receives an output from the tenth inverter I10 as a reset input and an output from the ninth inverter I9 as a set input. The sixth flip-flop 322 receives an output from the tenth inverter I10 as a reset input and a first output Q3 of the fifth flip-flop 321. The first buffer 323 buffers a first output Q4 of the sixth flip-flop 322. The third pulse signal generator 324 generates a third pulse signal in response to an output from the first buffer 323. The fourth pulse signal generator 325 generates a fourth pulse signal in response to the third pulse signal. The eleventh inverter I11 inverts the fourth pulse signal. The seventh flip-flop 326 receives the output from the tenth inverter I10 as a reset input and an output from the eleventh inverter I11 as a set input. The fifth pulse signal generator 327 generates a fifth pulse signal in response to a second output $\overline{Q5}$ of the seventh flip-flop 326. The second buffer 328 buffers the fifth pulse signal. The delay 329 delays an output from the second buffer 328 to thereby output the activation signal ACT.

Figure 7B:
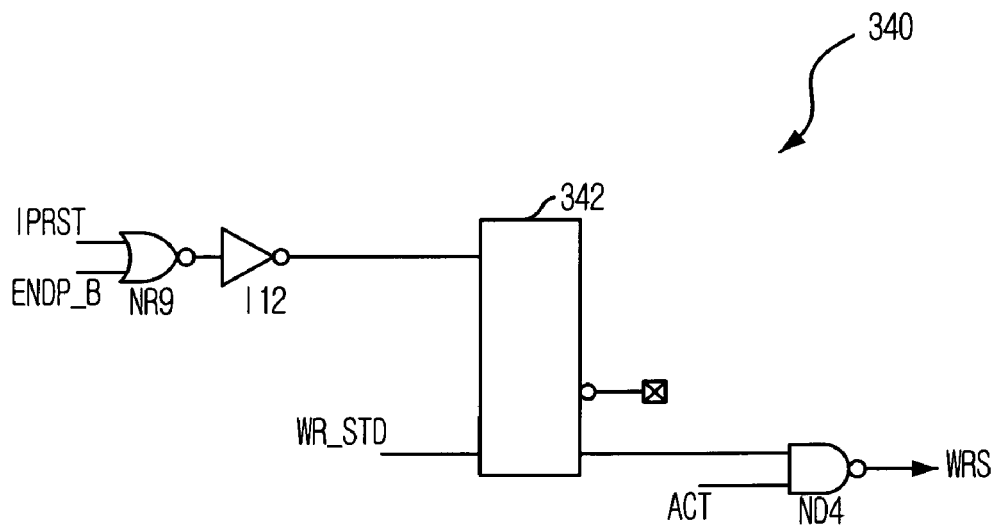
FIG. 7B is a schematic circuit diagram describing a first process signal generator shown in FIG. 6.

FIG. 7B is a schematic circuit diagram describing the first process signal generator 340 shown in FIG. 6.

As shown, the first process signal generator 430 is provided with a ninth NOR gate NR9, a twelfth inverter I12, a sixth flip-flop 342, and a fourth NAND gate ND4. The ninth NOR gate NR9 receives the initializing signal IPRST and the second end-up signal ENDP_B. The twelfth inverter I12 inverts an output from the ninth NOR gate NR9. The sixth flip-flop 342 receives an output from the twelfth inverter I12 as a reset input and the first process request signal WR_STD as a set input. The fourth NAND gate ND4 receives a first output Q6 of the sixth flip-flop 342 and the activation signal ACT to thereby output the first process signal WRS.

Figure 7C:
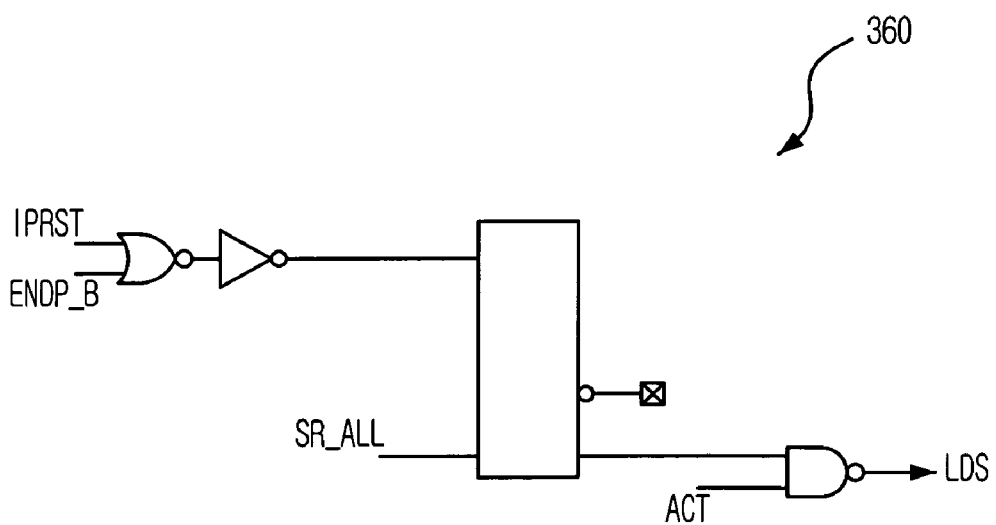
FIG. 7C is a schematic circuit diagram depicting a second process signal generator shown in FIG. 6.

FIG. 7C is a schematic circuit diagram depicting the second process signal generator 360 shown in FIG. 6.

Compared with the first process signal generator 340, the second process signal generator 360 has the same circuit structure except a fact that the second process signal LDS is outputted in response to the total process request signal SR_ALL.

Figure 7D:
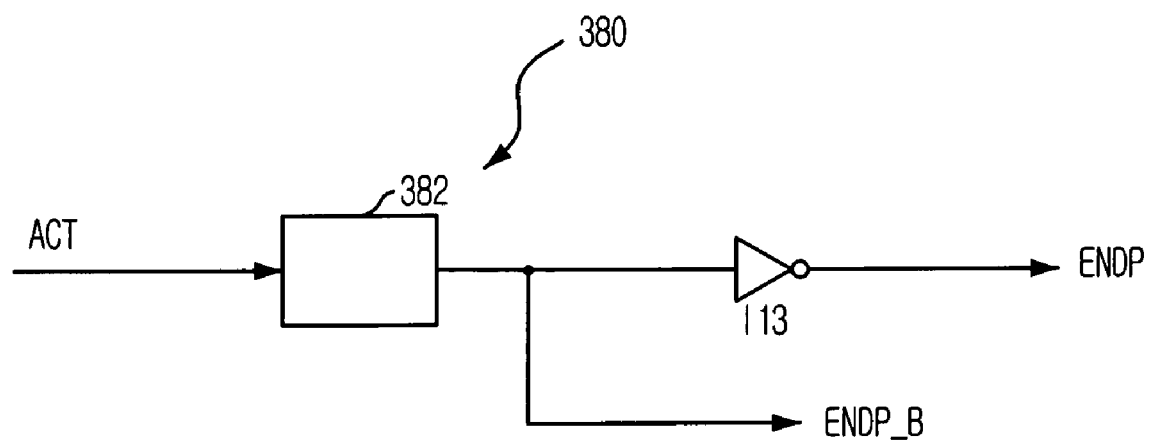
FIG. 7D is a schematic circuit diagram describing an end-up signal generator shown in FIG. 6.

FIG. 7D is a schematic circuit diagram describing the end-up signal generator 380 shown in FIG. 6.

As shown, the end-up signal generator 380 includes a sixth pulse signal generator 382 and a thirteenth inverter I13. The sixth pulse signal generator 382 outputs the second end-up signal ENDP_B by delaying the activation signal ACT. The thirteenth inverter I13 inverts the second end-up signal ENDP_B to thereby output the first end-up signal ENDP.

Figure 8:
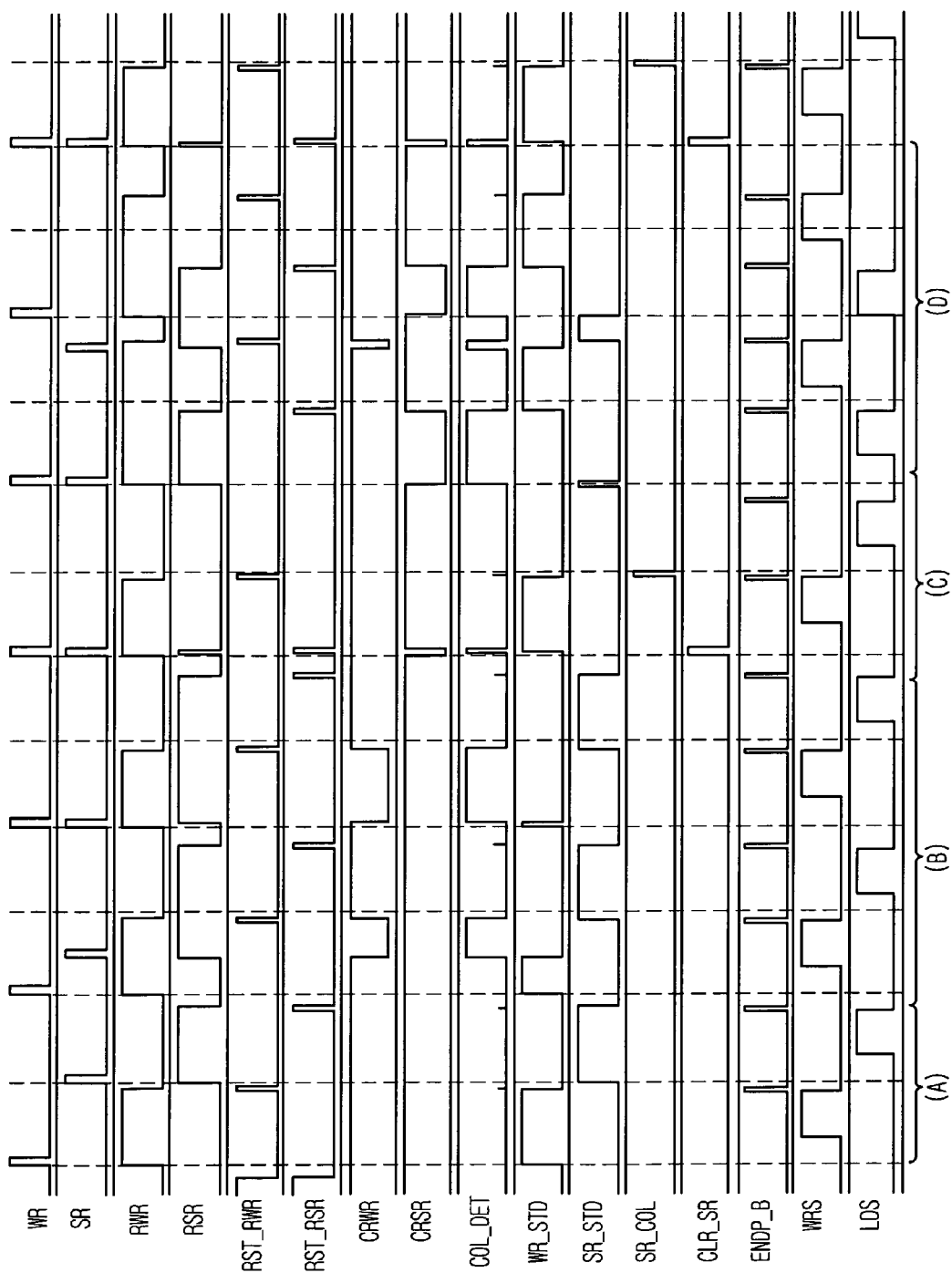
FIG. 8 is a waveform demonstrating an operation of the FCFS device in accordance with the preferred embodiment of the present invention in case when at least two input signals are inputted.

FIG. 8 is a waveform demonstrating an operation of the FCFS device in accordance with the preferred embodiment of the present invention in case when at least two input signals are inputted.

In an A sector, the second input signal SR is inputted after the first process signal WRS of the first input signal WR is inactivated. Therefore, in the (A) sector, the FCFS device operates normally.

In a B sector, the second input signal SR is inputted at the activation sector of the first process signal WRS of the first input signal WR.

In this case, the first edge detector 120 detects whether the first input signal WR is inputted or not. If the first input signal WR is inputted, i.e., inputted, the first edge detector 120 activates the first edge detecting signal RWR. The first process requesting block 160 activates the first process request signal WR_STD in response to the first edge detecting signal RWR. The signal processing block 300 activates the first process signal WRS in response to the first process request signal WR_STD.

Then, if the second input signal SR is inputted during the activation sector of the first process signal WRS of the first input signal WR, the second edge detector 140 activates the second edge detecting signal RSR in response to the second input signal SR. Meanwhile, because the activation sectors of the first and the second edge detecting signals RWR and RSR are overlapped, the first process request signal WR_STD is inactivated by the first process requesting block 160; the first request control signal CRWR is activated by the collision detector 220.

After the first process signal WRS is inactivated, the first end-up signal ENDP is activated. The first process requesting block 160 activates the first reset signal RST_RWR in response to the first process control signal CRWR and the first end-up signal ENDP to thereby reset the first edge detector 120. Meanwhile, the second end-up signal ENDP_B is also activated after the first process signal WRS is inactivated. The signal processing block 300 and the concurrent input processing block 240 are reset in response to the second end-up signal ENDP_B.

Because the first edge detector 120 is reset, the first edge detecting signal RWR is inactivated. The second process request SR_STD is activated by the second process requesting block 180. The signal processing block 300 activates the second process signal LDS in response to the second process request signal RSR and activates the first end-up signal ENDP after a predetermined time. The second process requesting block 180 activates the second reset signal RST_RSR in response to the second edge detecting signal RSR and the first end-up signal ENDP. The second edge detector 140 is reset in response to the second reset signal RST_RSR. Further, the signal processing block 300 and the concurrent input processing block 240 are reset in response to the second end-up signal ENDP_B.

In a C sector, the input signals WR and SR are inputted concurrently. In this case, the input signals WR and SR are processed in accordance with a predetermined priority.

Because the input signals WR and SR are inputted concurrently, the edge detectors 120 and 140 concurrently activate the edge detecting signals RWR and RSR, respectively. Subsequently, the collision detector 220 detects that the activation sectors of the edge detecting signals RWR and RSR are overlapped and activates the collision detection signal COL_DET. The concurrent input processing block 240 activates the clear input signal CLR_SR in response to the collision detection signal COL_DET. The process requesting block 180 resets the second edge detector 140 in response to the clear input signal CLR_SR. Therefore, the first process signal WRS is activated in accordance with the priority.

After the first process signal WRS is inactivated, the end-up signals ENDP and ENDP_B are activated. The first process requesting block 160 resets the first edge detector 120 in response to the first end-up signal ENDP and the first request control signal CRWR. Meanwhile, the concurrent input processing block 240 activates the collision process signal SR_COL in response to the first end-up signal ENDP to thereby activate the second process signal LDS.

Finally, in a D sector, the first input signal WR is inputted at the activation sector of the second process signal LDS of the second input signal SR.

The second process signal LDS of the second input signal SR is activated. After the activation sector of the second process signal LDS is terminated, the first process request signal WR_STD is activated to thereby activate the first process signal WRS.

Compared the D sector with the B sector, the FCFS device of the present invention processes an input first inputted above all and, then, the other inputs inputted behind in order.

The FCFS device for an asynchronous input signal in accordance with the present invention improves a reliability of a device including the FCFS device by reliably processing the inputs, even when the second input signal is inputted at the activation sector of the first process signal in accordance with the first input signal and even when a plurality of input signals are inputted concurrently.

That is, when the second input signal is inputted at the activation sector of the second process signal in accordance with the first input signal, the FCFS delays the process of the second input signal until the process of the first input signal is completed. Further, when a plurality of the input signals is inputted concurrently, the FCFS device processes the input signals in accordance with a predetermined priority.

The abovementioned FCFS device for an asynchronous input signal can be applied for a signal process of a device, e.g., a display frame memory, which is accessed asynchronously. Further, the FCFS can be applied for every kind of semiconductor devices receiving a plurality of input signals by processing the inputs with a predetermined priority.

In the above mentioned embodiment, the present invention is applied for a case receiving two input signals. However, the present invention is possible to be applied to cases receiving inputs more than two in other embodiment.

The present application contains subject matter related to Korean patent application No. 2004-59671, filed in the Korean Patent Office on Jul. 29, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A device for preventing a process collision based on a plurality of input signals, comprising:
   an input block for receiving a first and a second input signals to thereby generates a first and a second process request signals;
   a collision controller for controlling the process collision in accordance with a predetermined priority; and
   a signal processing block for outputting a first process signal in response to the first process request signal and outputting a second process signal in response to the second process request signals;
   wherein the process collision is caused by one of a case when the second input signal is inputted at an activation sector of the first process signal of the first input signal, a case when the first input signal is inputted at an activation sector of the second process signal of the second input signal, and a case when the first and the second inputs are inputted concurrently;
   wherein the input block includes:
   a first edge detector for detecting, whether the first input signal is inputted to thereby output a first edge detect signal;
   a second edge detector for detecting whether the second input signal is inputted to thereby output a second edge detect signal;
   a first process request block for outputting the first process request signal in response to the first edge detect signal while the second edge detect signal is inactivated; and
   a second process request block for outputting the second process request signal in response to the second edge detect signal while the first edge detect signal is inactivated.

2. The device as recited in claim 1, wherein the collision controller includes:
   a collision detector for detecting whether activation sectors of the first and the second edge detect signals are overlapped to thereby output a collision detection signal activated when the activation sectors of the first and the second edge detect signals are overlapped; and
   a concurrent input processing block for detecting whether the collision detect signal is activated to thereby inactivate the second edge detect signal in accordance with the priority and for controlling the signal processing block to thereby activate the second process signal after a predetermined time.

3. The device as recited in claim 2, wherein the collision detector includes:
   a request control signal generator for generating a first request control signal resetting the first edge detector when the second edge detect signal is inputted after the first edge detect signal is inputted and for generating a second request control signal resetting the second edge detector when the first edge detect signal is inputted after the second edge detect signal is inputted; and
   a collision detection signal generator for generating the collision detection signal when the activation sectors of the first and the second edge detect signals are overlapped.

4. The device as recited in claim 3, wherein the concurrent input processing block includes:
   a clear signal generator for generating a clear signal for inactivating the second edge detect signal in one of the cases when the collision detection signal and the first process request signal are activated and when the collision detection signal and the second process request signal are activated; and
   a collision processing signal generator for generating a collision processing signal activating the second process signal after the predetermined time in response to a second output from the clear signal generator.

5. The device as recited in claim 4, wherein the signal processing block activates an end-up signal in one of cases when the first process signal is inactivated and when the second process signal is inactivated.

6. The device as recited in claim 5, wherein the signal processing block includes:
   a total process request signal generator for receiving the second process request signal and the collision process signal to thereby generate a total process request signal;
   an activation signal generator for generating an activation signal when the total process request signal and the first process request signal are activated;
   a first process signal generator for generating the first process signal in response to the activation signal when the first process request signal is activated;
   a second process signal generator for generating the second process signal in response to the activation signal when the second process request signal is activated; and
   an end-up signal generator for generating the end-up signal after a predetermined time from when the activation signal is activated.

7. The device as recited in claim 6, wherein the end-up signal generator includes:
   a first pulse generator for receiving the activation signal to thereby output a second end-up signal; and
   a first inverter for inverting the second end-up signal to thereby generate the first end-up signal.

8. The device as recited in claim 7, wherein the clear signal generator includes:
   a first OR gate receiving the first and the second process request signals;
   a second OR gate for receiving an output from the first NOR gate and an initializing signal; and
   a first flip-flop for receiving an output from the second NOR gate and the collision detection signal to thereby output a first output as the clear signal.

9. The device as recited in claim 8, wherein the collision process signal generator includes:
a second flip-flop for activating a first output in response to a second output of the first flip-flop;
a second pulse generator for generating a pulse signal in response to the first output of the second flip-flop;
a third pulse generator for receiving an output from the second pulse generator to thereby output the collision process signal of a pulse form;
a second inverter for inverting the first edge detect signal; a first NAND gate for receiving an output from the second inverter and a second output from the second flip-flop;
a first NOR gate for receiving an output from the first NAND gate, the second end-up signal, and the initializing signal; and
a third inverter for inverting an output from the first NOR gate to thereby reset the second flip-flop.

10. The device as recited in claim 9, wherein the first process request block resets the first edge detector in one of cases when the first end-up signal and the first request control signal are activated and when the first end-up signal and the first process request signal are activated.

11. The device as recited in claim 10, wherein the second process request block resets the second edge detector in one of cases when the first end-up signal and the first request control signal are activated, when the first end-up signal and the first process request signal are activated, and when the clear input signal is activated.

12. The device as recited in claim 6, wherein the total process request signal generator is implemented with a third OR gate for receiving the second process request signal and the collision process signal.

13. The device as recited in claim 3, wherein the request control signal generator includes:
a first RS-latch receiving the first edge detect signal as a set input and the second edge detect signal as a reset input;
a first NAND gage for receiving the first and the second edge detect signals;
a first NOR gate for receiving a first output from the first RS-latch and an output from the first NAND gate;
a first inverter for inverting an output from the first NOR gate to thereby output the first request control signal;
a second NOR gate for receiving a second output from the first RS-latch and the output from the first NAND gate; and
a second inverter for inverting an output from the second NOR gate to thereby output the second request control signal.

14. The device as recited in claim 13, wherein the collision detection signal generator includes:
a first OR gate for receiving the first and the second edge detect signals;
an exclusive-OR gate for receiving the first and the second edge detect signals;
an exclusive-NOR gate for receiving an output from the first OR gate and an output from the exclusive-OR gate; and
a third inverter for inverting an output form the exclusive-NOR gate to thereby output the collision detection signal.

15. The device as recited in claim 14, wherein the activation signal generator includes:
a third NOR gate for receiving the total process request signal and the first process request signal;
a fourth inverter for inverting an output from the third NOR gate;
a fourth NOR gate for receiving the second end-up signal and the initializing signal;
a fifth inverter for inverting an output from the fourth NOR gate;
a third flip-flop for receiving an output from the fifth inverter as a reset input;
a fourth flip-flop for receiving a first output of the third flip-flop as a set input and the output from the fifth inverter as a reset input;
a first buffer for buffering an output from the fourth flip-flop;
a fourth pulse generator for generating a first pulse signal in response to an output from the first buffer;
a fifth pulse generator for generating a second pulse signal in response to the first pulse signal;
a sixth inverter for inverting the second pulse signal;
a fifth flip-flop for receiving an output from the sixth inverter as a set input and the output from the fifth inverter as a reset input;
a sixth pulse generator for generating a third pulse signal in response to a second output from the fifth flip-flop;
a second buffer for buffering the third pulse signal; and
a first delay for delaying an output form the second buffer to thereby output the activation signal.

16. The device as recited in claim 15, wherein the first process signal generator includes:
a fifth NOR gate for receiving the second end-up signal and the initializing signal;
a seventh inverter for inverting an output from the fifth NOR gate;
a sixth flip-flop for receiving the first process request signal as a set input and an output from the seventh inverter as a reset input; and
a second NAND gate for receiving a first output from the sixth flip-flop and the activation signal to thereby output the first process signal.

17. The device as recited in claim 15, wherein the second process signal generator includes:
a fifth NOR gate for receiving the second end-up signal and the initializing signal;
a seventh inverter for inverting an output from the fifth NOR gate;
a sixth flip-flop for receiving the total process request signal as a set input and an output from the seventh inverter as a reset input; and
a second NAND gate for receiving a first output from the sixth flip-flop and the activation signal to thereby output the second process signal.

18. The device as recited in claim 15, wherein the first process request block includes:
a fifth NOR gate for receiving an inverted first edge detect signal and the second edge detect signal to thereby output the first process request signal; and
a first reset signal generating block for generating a first reset signal resetting the first edge detector.

19. The device as recited in claim 18, wherein the first reset signal generating block includes:
a second delay for delaying the first process request signal;
a seventh inverter for inverting the first end-up signal;
a second NAND gate for receiving an output from the seventh inverter and an output from the second delay;
a eighth inverter for inverting an output from the second NAND gate;
a sixth NOR gate for receiving the first end-up and the first request control signal;
a fourth OR gate for receiving an output from the sixth NOR gate and an output from the eighth inverter;

a seventh NOR gate for receiving an output form the fourth OR gate and the initializing signal; and a ninth inverter for inverting an output from the seventh NOR gate to thereby output the first reset signal.

20. The device as recited in claim 15, wherein the second process request block includes:

a fifth NOR gate for receiving an inverted second edge detect signal and the first edge detect signal to thereby output the second process request signal; and a second reset signal generating block for generating a second reset signal resetting the second edge detector.

21. The device as recited in claim 18, wherein the first reset signal generating block includes:

a second delay for delaying the second process request signal;

a seventh inverter for inverting the first end-up signal;

a second NAND gate for receiving an output from the seventh inverter and an output from the second delay;

a eighth inverter for inverting an output from the second NAND gate;

a sixth NOR gate for receiving the first end-up and the second request control signal;

a fourth OR gate for receiving an output from the sixth NOR gate, an output from the eighth inverter, and the clear signal;

a seventh NOR gate for receiving an output form the fourth OR gate and the initializing signal; and a ninth inverter for inverting an output from the seventh NOR gate to thereby output the second reset signal.

* * * * *